US010425444B2

(12) United States Patent
Elworthy

(10) Patent No.: US 10,425,444 B2
(45) Date of Patent: Sep. 24, 2019

(54) SOCIAL ENGINEERING ATTACK PREVENTION

(71) Applicant: BAE Systems Applied Intelligence US Corp., Milford, CT (US)

(72) Inventor: Craig Elworthy, Lynnfield, MA (US)

(73) Assignee: BAE Systems Applied Intelligence US Corp., Milford, CT (US)

( * ) Notice: Subject to any disclaimer, the term of this patent is extended or adjusted under 35 U.S.C. 154(b) by 238 days.

(21) Appl. No.: 15/616,448

(22) Filed: Jun. 7, 2017

(65) Prior Publication Data

US 2018/0359280 A1    Dec. 13, 2018

(51) Int. Cl.
*H04L 29/06*    (2006.01)

(52) U.S. Cl.
CPC ...... *H04L 63/1483* (2013.01); *H04L 63/1416* (2013.01); *H04L 63/1425* (2013.01)

(58) Field of Classification Search
CPC . H04L 63/20; H04L 63/1483; H04L 63/1491; H04L 63/1416; H04L 63/123; H04L 63/1433
USPC .................................................. 726/1, 22–25
See application file for complete search history.

(56) References Cited

U.S. PATENT DOCUMENTS

| | | | | |
|---|---|---|---|---|
| 7,373,664 B2* | 5/2008 | Kissel | .................... | G06F 21/562 713/188 |
| 7,526,809 B2* | 4/2009 | Liang | .................... | G06F 21/566 705/51 |
| 7,668,951 B2* | 2/2010 | Lund | .................... | G06Q 10/107 709/204 |
| 7,673,342 B2* | 3/2010 | Hursey | ................ | G06Q 10/107 709/206 |
| 7,836,506 B2* | 11/2010 | Liu | ...................... | G06F 11/2294 713/187 |
| 7,870,608 B2* | 1/2011 | Shraim | .................... | H04L 51/12 726/22 |
| 8,056,128 B1* | 11/2011 | Dingle | .................... | G06F 16/35 726/22 |
| 8,645,478 B2 | 2/2014 | Gaddala | | |
| 8,875,293 B2* | 10/2014 | McDougal | .............. | G06F 21/56 713/188 |
| 9,123,027 B2 | 9/2015 | Srivastava et al. | | |
| 9,241,009 B1 | 1/2016 | Starink et al. | | |
| 9,245,115 B1 | 1/2016 | Jakobsson | | |
| 9,467,435 B1 | 10/2016 | Tyler et al. | | |
| 9,912,694 B2* | 3/2018 | Hagar | ................. | H04L 63/0236 |

\* cited by examiner

*Primary Examiner* — Hosuk Song
(74) *Attorney, Agent, or Firm* — Maine Cernota & Rardin

(57) ABSTRACT

A system and method for preventing email social engineering attacks, comprising a whaling/CEO fraud/imposter protection module; a vendor/supplier fraud protection module; a personal email fraud/display name abuse module; an email traffic modeling module; an auto-configure/learn mode module; an in-line protection module; an integrated malware analysis module; an email fingerprinting module; and a trust score module.

19 Claims, 17 Drawing Sheets

LAN OPERATIONAL ENVIRONMENT

EMAIL PROTECTION PLATFORM

HIGH LEVEL PROTECTION METHOD FLOW CHART

CONFIGURATION / SETUP MODULE

TRUST SCORE ACTIONS MODULE

TRUST SCORE MESSAGE DISPLAY MODULE

TRUST SCORE REPORTING MODULE

WHALING / IMPOSTER PROTECTION FLOW CHART

VENDOR / SUPPLIER FRAUD PROTECTION FLOW CHART

PERSONAL EMAIL FRAUD PROTECTION FLOW CHART

AUTO-CONFIGURE / LEARN FLOW CHART

TRUST SCORE FLOW CHART

EMAIL FINGERPRINTING FLOW CHART

EMAIL MESSAGE INCLUDING TRUST SCORE DISPLAY BANNER

SOCIAL ENGINEERING ATTACK PREVENTION

FIELD OF THE DISCLOSURE

Embodiments relate to a system and method in the field of security and, more particularly, to monitoring for social engineering attacks in a computer network email environment.

BACKGROUND

While Social Engineering (SE) has been known for some time, it has not been a widespread threat to email until recently. A socially engineered attack can take the form of an email pretending to be from a high ranking individual asking for personal information, tax returns, or to wire funds. These types of socially engineered emails are known as whaling or business email compromise; they contain no attachments and no URLs, there is nothing to click on or analyze. Attackers use widely available social platforms (Facebook, LinkedIn, Twitter) to define their target and craft a highly believable message. Human resources, payroll, and finance individuals are usually the targets. The messages are very low volume, and highly targeted. Losses from SE attacks can be immediate and large. Over 3 billion dollars have been stolen since 2015 as a result of these attacks, and the growth has been over 270% since 2015, reports the FBI. Social Engineering attack losses impact revenue globally. No company is immune, and secure email gateways (SEGs) have not been traditionally focused on this space.

Generally, social engineering includes any attempt to manipulate persons into divulging sensitive information (e.g., personal information, financial information, computer security data, work-related confidential information, etc.). Thus, social engineers rely on people, rather than computer security holes, to obtain sensitive information through mediums such as email, Internet, or phone. Examples of social engineering tactics that rely on email include "phishing", "spoofing", and "pharming" scams. Phishing and spoofing include scams that combine social engineering tactics with email. Phishing includes the process of attempting to acquire information such as usernames, passwords, or financial information by masquerading as a legitimate and trustworthy entity in an electronic communication such as email. For example, an email may purport to be from a bank, a social website, or online payment processors. Such emails often direct recipients to enter sensitive information into a seemingly legitimate website that is actually a sham. Spoofing may occur when certain properties of an email message, such as the "FROM" field in the message header, have been altered to make it appear as if it came from a different source. Thus, the recipient may be tricked into believing that the email was sent from a legitimate source, and thereby, reveal sensitive information.

Given the publicity around dangerous email messages, end users lack trust in messages, even though most messages are harmless. This creates a situation wherein IT administrators are overwhelmed by emails submitted by end users, and must dedicate significant time and energy to investigation of many generally acceptable email messages.

While this has been a growing problem, it has recently hit critical mass. Secure Email Gateway (SEG) vendors are failing because a traditional rules-based approach will not catch all of the variants of this type of attack. Untenable billions of variations of indicators would have to be addressed.

What is needed is a system and method to provide the end user with a trust score on each message, providing visibility and insight into the risk factors, allowing them to make an informed decision on the validity of each email message. Even when a message is totally safe, users know it, preventing users from sending the message to their IT staff.

SUMMARY

An embodiment provides a computer implemented method for processing email messages to prevent email social engineering attacks, comprising receiving an email message (405); applying initial trust score generation analytics (410) to the electronic message, producing an initial trustability score (415); sending, if the initial trustability score is below a trustability score threshold and the message comprises a link or attachment (420), the message to a dynamic analysis module (425); sorting, in a score sorting module (430), an output trustability score from the dynamic analysis module into one of three trust levels good, suspect, or bad (435, 440, 445); processing, by an administrator configured rules module (450), output of the score sorting module (430); sending, if the initial trustability score is above the trustability score threshold, the message to the administrator configured rules module (450); processing the electronic message (405) in the administrator configured rules module (450), wherein the electronic message (405) is not quarantined (455), quarantined (460), or blocked from reaching recipient (465), based on the three trust levels (435, 440, 445); and processing the electronic message (405) in a user configured rules module (470), wherein the electronic message (405) is rescanned (480) if, at a clicktime, a rescanned trustability score is below a trustability score threshold trustability score of the electronic message (405) is updated (485), and the electronic message (405) is returned to the dynamic analysis module (425) if the updated trustability score is below a trustability score threshold and the message comprises a link or attachment (420); whereby the email messages are classified as good, suspect, or bad (435, 440, 445). In embodiments the processing comprises annotating the email message with a trust level indicator and at least one trust level reason. In other embodiments the processing comprises at least one trustability report. In subsequent embodiments the at least one trustability report comprises at least one of a trust score overview report (905); a trust score message domain detail report (910); an authentication score report (915); a reputation score report (920); a message tracking report (925); and a user reply/forward report (930). For additional embodiments the trust score generation analytics (410) comprises features generated from data sources; the data sources comprising derived properties of the email comprising a history of the email and/or information about customers' users; the features being indicators to differentiate between a trustworthy email and a malicious email. In another embodiment the method comprises machine learning, wherein all features are fed into a model, presenting good and bad messages test data, training a model to discern between the good, the suspect, and the bad messages. For a following embodiment the rules are weighted with a scoring system to provide a trustability score. In subsequent embodiments the rules that are triggered provide reason information for the email message classifications as good, suspect, or bad (435, 440, 445). In additional embodiments the rules each comprise a rule name, a rule test, and rule actions with default values; the rules linking combinations of features and comparisons against thresholds, identifying combinations of features indicating bad emails.

Another embodiment provides a system for processing email messages to prevent email social engineering attacks comprising a processor (310); a memory system (315) comprising one or more computer-readable non-transitory media configured to store instructions for an email protection application (325) comprising a configuration setup module (330); a trust score generation analytics module (335) configured by the configuration setup module (330) to process the email messages; a trust score actions module (340) performing actions based on output of the trust score generation analytics module (335); a trust score message display module (345), generating the message display from output of the trust score generation analytics module (335); and a trust score reporting module (350), producing reports from output of the trust score generation analytics module (335); whereby the email messages are classified as good, suspect, or bad (435, 440, 445). In included embodiments the configuration setup module (330) comprises global and user data management processing (505); provisioning processing (510); de-provisioning processing (515); service priming processing (520); list population processing (525); inbound configuration processing (530); outbound configuration processing (535); policy configuration processing (540); and trust score rule wizard processing (545). For additional embodiments the trust score generation analytics module (335) comprises feature generation processing (605); feature review processing (610); trustability score processing (615); trustability decision processing (620); global list processing (625); customer list processing (630); whaling/imposter protection processing (635); supplier fraud protection processing (640); personal email fraud protection processing (645); homograph processing (650); email fingerprinting processing (655); and analytic feedback loop processing (660). In yet further embodiments the trust score actions module (340) comprises inbound message routing and filtering (705); outbound message routing and filtering (710); inbound quarantine processing (715); and outbound quarantine processing (720). In related embodiments the trust score message display module (345) comprises a message trust score indicator display (805); a message trust score reasons display (810); and a message trust score footer display (815). For further embodiments the trust score reporting module (350) comprises at least one of a trust score overview report (905); a trust score message domain detail report (910); an authentication score report (915); a reputation score report (920); a message tracking report (925); and a user reply/forward report (930). In ensuing embodiments auto configure learning comprises initiating learning (1305); executing feedback loops to identify users who have fallen victim (1310); and using the feedback loops to create individually variable scores, the individually variable scores varying between individual, organization, unit, and company (1315). For yet further embodiments, the processing comprises rationalizing scores with spam and antivirus controls (1405); configuring scores for use in inbound actions; presenting a trust score based on 1 to 100 to administrator rules (1415); configuring, by the administrator, which users see the trust score (1420); presenting a trust score message display in the message to user (1430); removing the trust score message display from message replies and forwards going outside an organization (1425); and plotting risk of inbound messages received on a trustability axis (1435). For more embodiments, the fingerprinting (655) comprises initiating communication pattern learning (1505); learning language (1510); learning grammar (1515); learning punctuation (1520); learning cadence (1525); learning commonly used words/phrases (1530); learning font preferences (1535); learning signature (1540); learning line spacing (1545); and saving learned fingerprint pattern (1550) for trust score analytics processing. In continued embodiments, at a clicktime, the email is reprocessed by the trust score generation analytics module (335) producing a rescanned trustability score; and if the rescanned trustability score is below a trustability score threshold trustability score of the electronic message is updated, and the electronic message is returned to the trust score actions module (340).

A yet further embodiment provides a non-transitory computer-readable medium for preventing email social engineering attacks comprising instructions stored thereon, that when executed on a processor, perform the steps of configuring an email protection application in a configuration setup module (330); processing email messages in a trust score generation analytics module (335) configured by the configuration setup module (330); performing actions in a trust score actions module (340) based on output of the trust score generation analytics module (335); generating, in a trust score message display module (345), a message display from output of the trust score generation analytics module (335); and producing, by a trust score reporting module (350), reports from output of the trust score generation analytics module (335); whereby the email messages are classified as good, suspect, or bad (435, 440, 445).

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows illustrative, but not exhaustive, of the scope of the invention.

Figure 1:
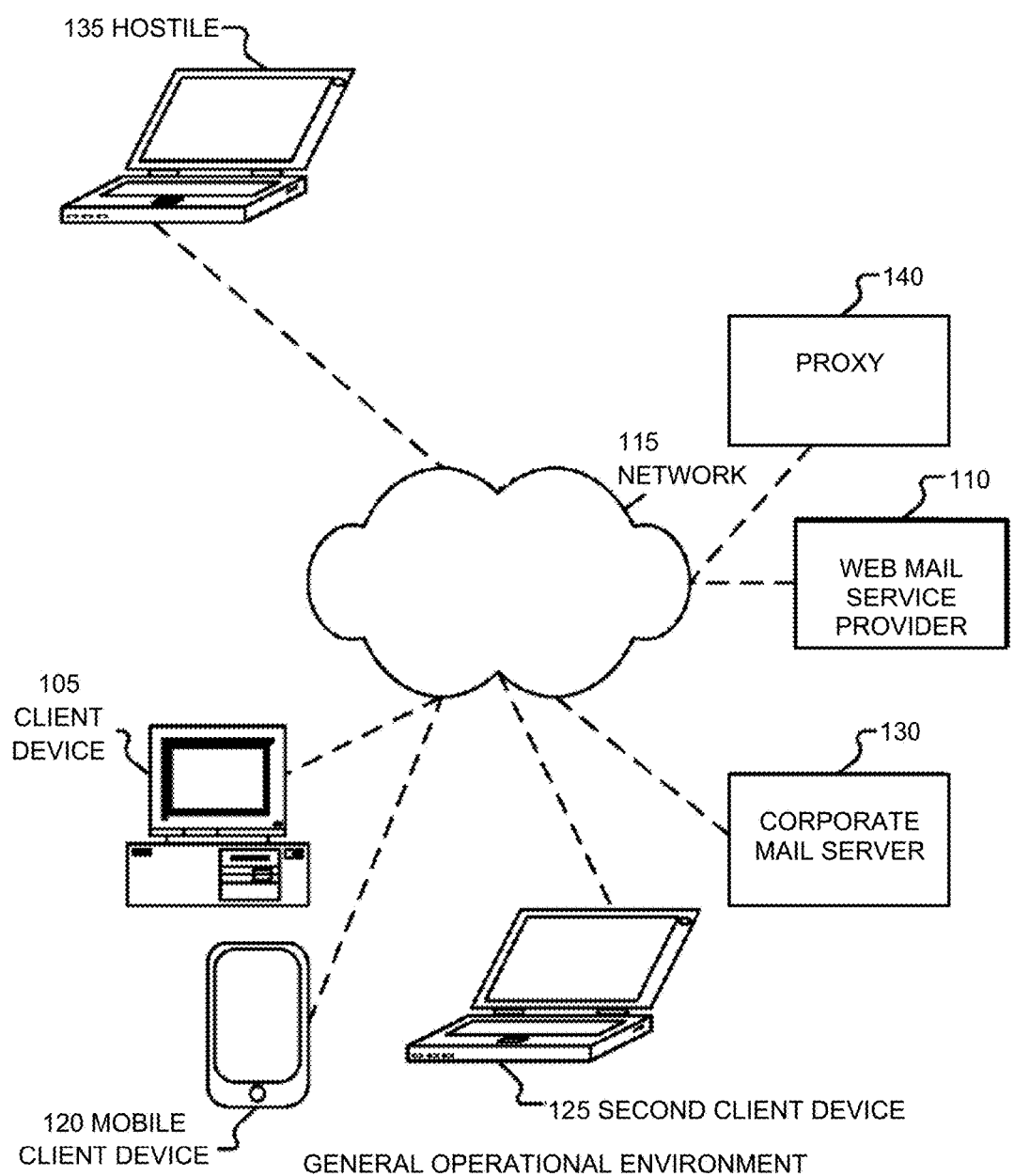
FIG. 1 depicts a general operational environment configured in accordance with an embodiment of the invention.

FIG. 1 is a general operational environment 100 vulnerable to SE attacks depicting defensive measures by which computer and other device users are protected from harmful communications. In the general environment shown, a user of client device 105 has an email account provided by web mail service provider 110. User of 105 visits provider 110's website with computer 105 via one or more networks depicted as network cloud 115 to read and write email. The email account may also be accessed via mobile phone 120. A second user, of client device 125, accesses an email account provided by his employer, hosted by corporate mail server 130. A hostile individual uses client device 135 to perpetrate fraud on victims. In embodiments, protection can be provided on devices 105, 120, or 125, or by web mail service provider 110, corporate mail server 130, or by a proxy 140 which can perform services on behalf of users as a third party subscription service. SE attacks can be implemented through any employee-accessed device in any location, potentially resulting in loss.

Figure 2:
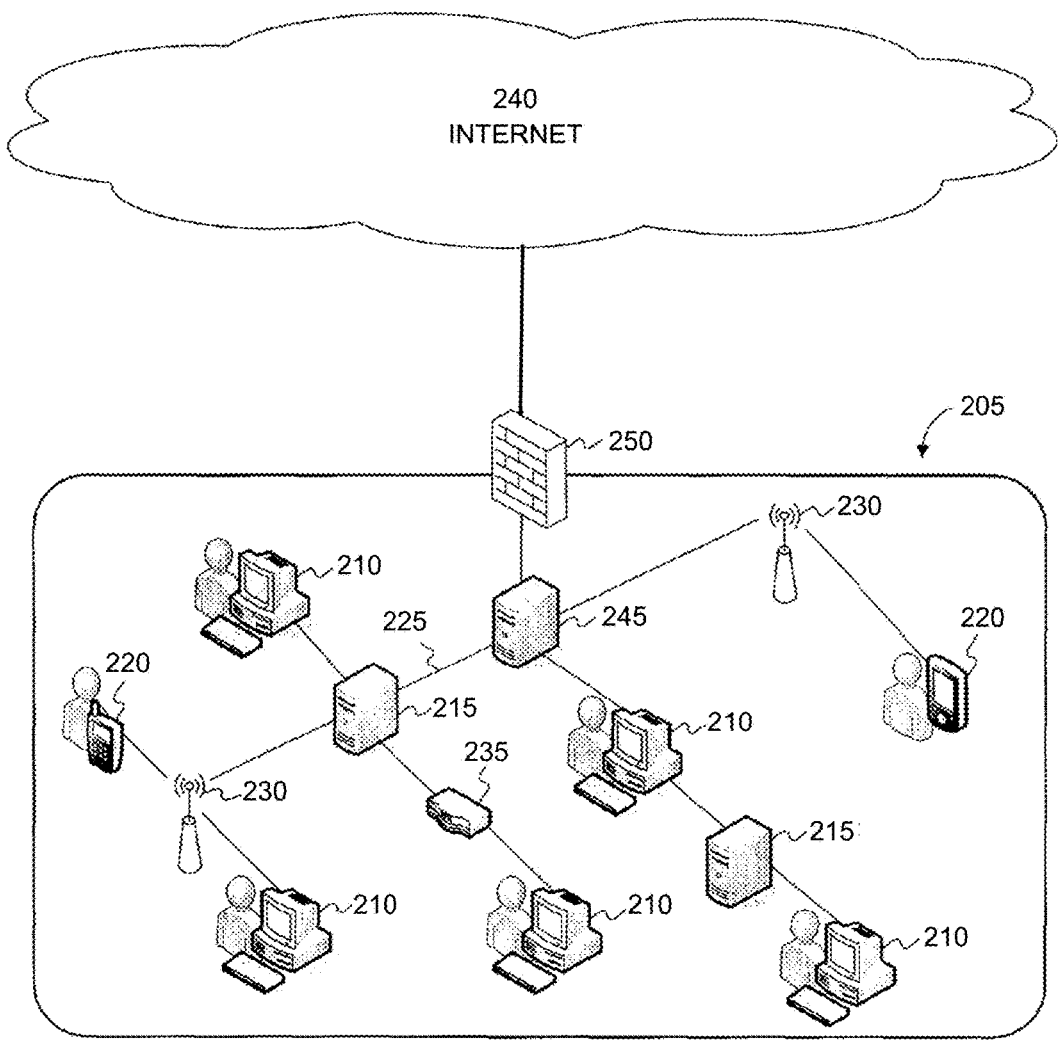
FIG. 2 depicts a network environment configured in accordance with an embodiment of the invention.

FIG. 2 portrays a network environment 200 vulnerable to SE attacks depicting protective measures from embodiments. Network 205 may include one or more computer workstations 210; one or more servers 215; and one or more mobile devices 220. Each device on network 205 may be connected with one or more other devices, such as by wired network cable 225 or by wireless transmitter 230 to, for example, network router 235. Other types of devices may be included in network 205, or they may be connected in a different manner. The devices in network 205 can be located in different geographic areas. Communications between devices within network 205 and devices outside of the network, such as devices connected to the Internet 240, may first pass through or be subject to one or more security devices or applications, such as a proxy server 245 or firewall 250.

Figure 3:
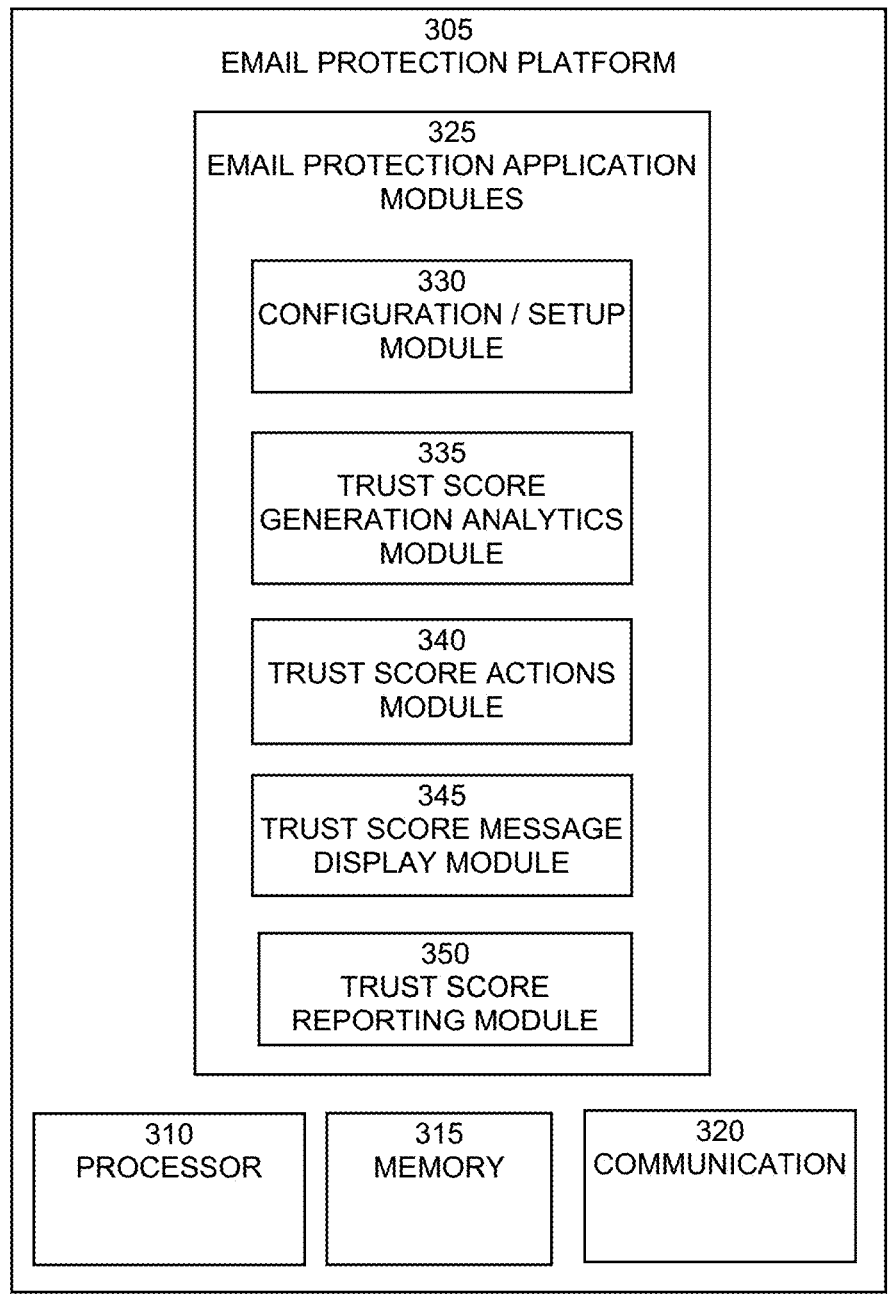
FIG. 3 depicts a simplified high-level block diagram of a platform configured in accordance with an embodiment.

FIG. 3 is a simplified high level block diagram 300 of a platform for preventing social engineering attacks on email messages. Platform embodiments provide in-line protection and model email traffic. Embodiments of platform 305 comprise a processor 310, memory 315, and communication 320 components. Platform 305 includes protection modules 325. Protection modules 325 comprise Configuration/Setup Module 330; Trust Score Generation Analytics 335; Trust Score Actions Module 340; Trust Score Display Module 345; and Trust Score Reporting Module 350. Module details will follow.

Figure 4:
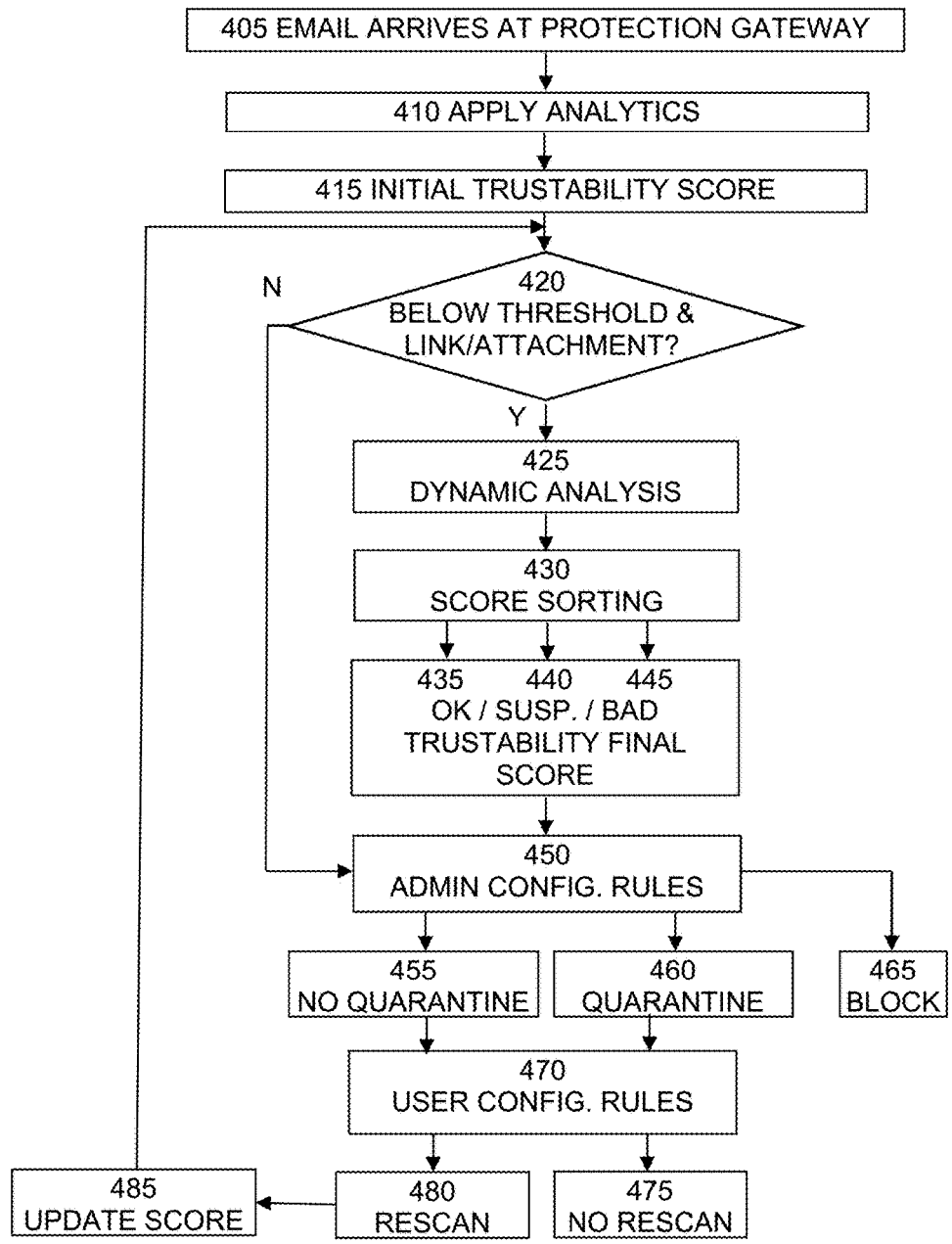
FIG. 4 is a simplified high-level method flowchart of an email protection platform method configured in accordance with an embodiment.

FIG. 4 is a simplified high level flow chart 400 of the steps of a method implemented by Email Protection Platform 305. For embodiments, steps comprise Email Arriving at Protection Gateway 405; Applying Analytics 410; returning with an Initial Trustability Score (1-100) 415. If this email also has a link/attachment, and it is below the trustability threshold between suspect and bad 420, the email is sent to Dynamic Analysis 425. Based on results from Dynamic Analysis (Score 1-100) 425, the email is Sorted 430 into Good (OK) 435, Suspicious 440, or Bad (malicious) 445. Either the email and/or the link/attachment can come back with a score of Good/OK (ex. score remains unchanged) 435, or Suspicious (ex. score drops) 440, or Bad/malicious (ex. score goes to 0%) 445. The output of Initial Trustability Score (1-100) 415 and Trustability Final Score 435, 440, 445 are processed by Administrator Configuration Rules 450. The administrator can configure 450 what should happen to the email based on output from the Initial Trustability Score or the Trustability Final Score. In this case, administrators may Not Quarantine 455, Quarantine all suspicious mail 460, or Block 465 based on the Trustability Score. User Configured Rules 470 determine what should happen to the email based on output from the Trustability Final Score after processing by Administrator Configuration Rules 450. For example, in embodiments, User Configuration Rules comprises rules such as 'If the email is delivered after Initial Scan and had a score over Good Trustability Threshold, do not rescan at ClickTime 475; if score is lower than Good Trustability Threshold, then the email is rescanned at ClickTime 480, and if it is then found to be Bad/malicious, Update the Score on the email 485. The Updated Score 485 is then returned to Check Threshold 420. If threshold 420 had been above threshold, Dynamic Analysis 425 would be skipped, proceeding to Administrator Configuration Rules 450.

Figure 5:
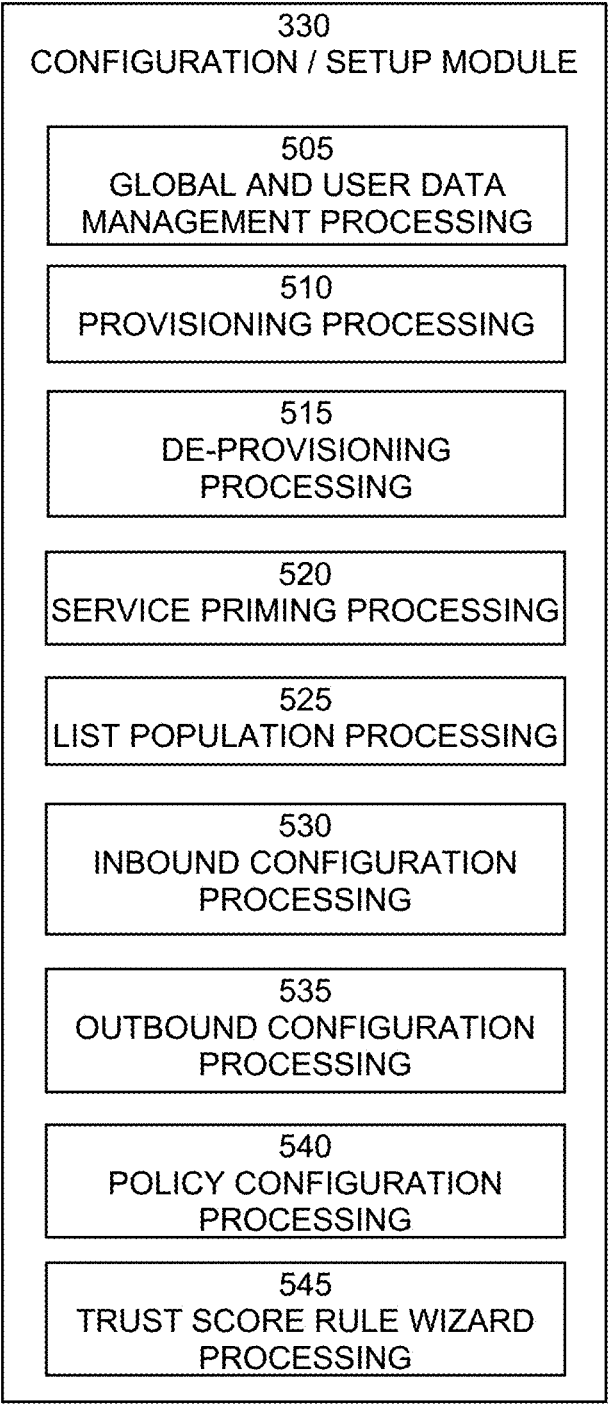
FIG. 5 is a simplified block diagram of a configuration/setup module configured in accordance with an embodiment.

FIG. 5 is a simplified block diagram of Configuration/Setup Module 500 (330 of FIG. 3) Embodiments of the Configuration/Setup Module comprise Global and User Data Management Processing 505; Provisioning Processing 510; De-Provisioning Processing 515; Service Priming Processing 520; List Population Processing 525; Inbound Configuration Processing 530; Outbound Configuration Processing 535; Policy Configuration Processing 540; and Trust Score Rule Wizard Processing 545. Global and User Data Management Processing 505 comprises lists and customer data. In embodiments, Provisioning 510 comprises the following actions: the customer's mail routing will be updated to inform the application to start sending information for all inbound messages that pass the Spam/AV to the Analytics platform to prime the analytic system with customer specific mail flow data; start generating and logging scores for inbound messages immediately; Default rules will be created; Red and Amber scores will be Log Tagged. The user indicator will be turned off when the service is provisioned. De-Provisioning Processing 515 comprises removing a customer from the Platform following a grace period. Messages remain in Quarantine until all messages have either been removed through actions or been removed for staying in the quarantine too long. In embodiments, Priming 520 comprises processing messages until all of the existing message tracking data has been loaded into the analytics system. In embodiments the processing runs during off high mail flow times in order to avoid affecting real time mail flow and reporting requests. Priming 520 data comprises: Date, Envelope Sender, Envelope Recipient, Connecting MTA IP Address, GEO IP data, and DMARC/DKIM/SPF results. List Population Processing 525 comprises lists for: Threat countries, Freemail domains, Social Engineering Terms, Social Engineering VIP Terms, Customer White/Black Lists, End User White/Black Lists, Internal domains, and Domain IP Lists. Inbound Configuration Processing 530 comprises choosing what to do with messages at each trust level. For embodiments, the following actions can be applied for each level: No Action; Monitor; Admin Quarantine; User Quarantine; and Discard. Outbound Configuration Processing 535 comprises processing for Administrators to look for messages that are replied or forwarded. The Trust Score of the original message will be considered and actions can be taken. The following actions are available in embodiments: No Action; Monitor; Admin Quarantine; User Quarantine; and Discard. Policy Configuration Processing 540; comprises specifying a small number of messages considered interesting; configuring messages to store; setting trust score levels. In embodiments, Trust Score Rule Wizard Processing 545 comprises creating rules that have a name, test, and actions with the default values. In embodiments, one wizard handles all default rules. For example rules for discard threshold, inbound actions and outbound actions based on color.

Figure 6:
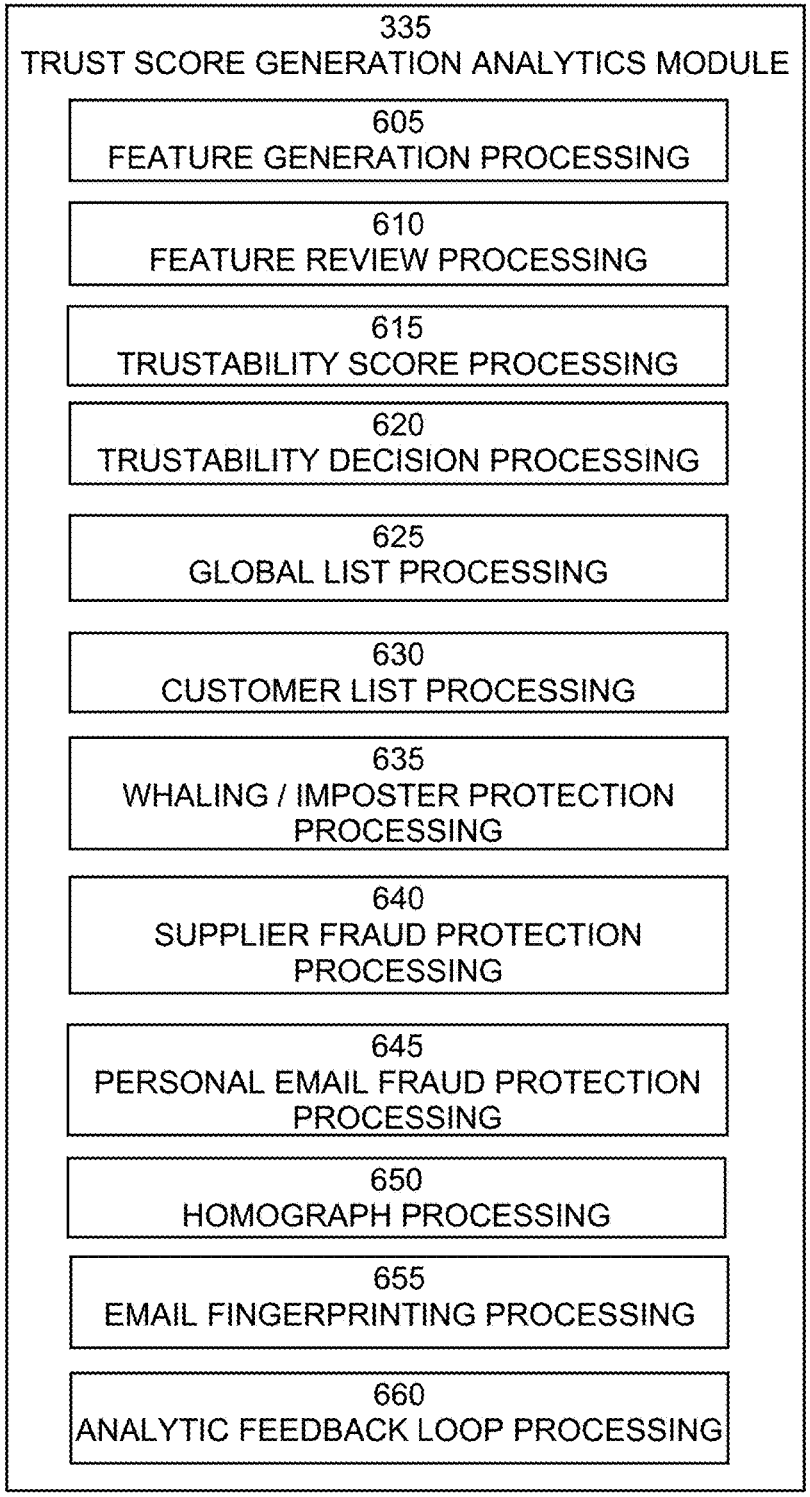
FIG. 6 is a simplified block diagram of a trust score generation analytics module configured in accordance with an embodiment.

FIG. 6 is a simplified block diagram of Trust Score Generation Analytics Module 600 (335 of FIG. 3) Embodiments of the Trust Score Generation Analytics Module comprise Feature Generation Processing 605; Feature Review Processing 610; Trustability Score Processing 615; Trustability Decision Processing 620; Global List Processing 625; Customer List Processing 630; Whaling/Imposter Protection Processing 635; Supplier Fraud Protection Processing 640; Personal Email Fraud Protection Processing 645; Homograph Processing 650; Email Fingerprinting Processing 655; and Analytic Feedback Loop Processing 660. Trust Score Generation Analytics Module 335 is the detection element of the Social Engineering Attack Detection system. On an email-by-email basis it takes in feeds of raw and enriched data about an individual email, and provides trustability information about that email, taking into account properties of the email, its delivery method, and historical trends in those properties. The trustability information is then used to take certain actions, inform the email recipient and/or inform the customer administrator. While embodiments of Email Protection Platform 305 are only applied to inbound external emails, the Platform learns from outbound emails, for example to understand who initiated a conversation.

Trust Score Generation Analytics Module 600 Input

Emails presented to the Platform comprise: all emails passing into the customer from the internet (scores will be returned for these emails); all emails passing from the customer to the internet (no scores will be returned for these emails). For embodiments, all emails analyzed are in the process of being delivered; emails already delivered and resident in a user's mailbox are not processed. Further, no customer-internal emails are presented to the analytics system. The interface input is a per-email set of Data Sources. For embodiments, these data sources comprise: Data extracted directly from the email (e.g. Sender Email Address and Email Direction); Data derived from email data through a process of data enrichment (e.g. reputation of the domain of the sender); Data from earlier "scans" or checks carried out on the email by the EPS system (e.g. DMARC checks). Email subjects and bodies are not presented to the analytics system. The detection of keywords and urgent terms in the subject and body is performed as part of the data enrichment process prior to presenting to Trust Score Generation Analytics Module 600. Additionally, there may be correlators and other information associated with the input data.

Trust Score Generation Analytics Module 600 Features Generation

Trust Score Generation Analytics Module 600 takes the per-email Data Sources and from these generates Features (derived properties of the email which may take into account previous email history and/or information about the customers' users). These Features are the indicators that help to differentiate between a trustworthy email and a scam/attack/malicious email. They are fed into the decision-making system which considers, based on the combination of features presented, how trustworthy an email is, and why. Several types of Features are generated: Simple features, copied directly from the Data Sources of the input email (e.g. Is the email marked as Urgent); Locally-computed Features and Historical trends, calculated from the Data Sources of the input email (e.g. does the display name look like the email address; has this sender sent emails to this recipient previously); Looked up Features, where aspects of the Data Sources are looked up against local databases (e.g. is this email to a customer employee flagged as a high value target); and Enriched Features, where something derived from the Data Sources is passed back through the enrichment process (e.g. obtaining the domain reputation of an email address within the email body). Some features are produced through local algorithms within the analytics system. Some of these algorithms have high computational complexities, for example homograph matching, and therefore may take considerable processing resource to run. Features may also require an element of history, for example to know whether a particular email address has sent emails to this recipient recently, or which IP addresses are usually used by a particular email domain. For embodiments, this history is stored and managed entirely within the Platform. Some Features require correlation of Data Sources with information from the customer user database. This could include, for example, looking for homographs of known customer email addresses, or identifying a customer email address as belonging to a VIP user. In embodiments the Platform will have a local copy of the customer user database, so that computationally-intensive algorithms can be run on this data efficiently. Some of the lookups offered through Data Enrichment may be accessed by Trust Score Generation Analytics Module 600 after the initial enrichment. This is because the Feature generation process may identify secondary domains and IP addresses that, for example, may be found within the message body or Header fields that were not identified and enriched by the Data Source Enrichment process. Some Features rely on lookups in Managed Global Lists, for example lists of List of "threat"

countries; List of Freemail domains; Social Engineering terms (although this email content check will happen before the email data is presented to the Trust Score Generation Analytics Module 600). The Global Lists relevant to the analytics are replicated into a read-only copy in the analytics system. Some Features rely on lookups in Customer-Specific lists, for example: Whitelist of domain-IP combinations (and/or authenticated domains); Blacklists of domain-IP combinations (and/or authenticated domains). In embodiments, whitelists and blacklists are handled by the Analytics system so that the black/whitelists influence the analytics score rather than directly override the analytics decision. In embodiments, Features require periodic reassessment to determine if additional features are required to differentiate new threats, or if Features are no longer needed.

Trust Score Generation Analytics Module 600 Trustability Decision

Features for each email are presented to the Trust Score Generation Analytics Module 600 which determines a trustability score backed up with Reasons. Trust Score Generation Analytics Module 600 decisions are rules-based and/or based on Machine Learning techniques. For rules-based, developer-coded rules link combinations of features and comparisons against thresholds to identify particular combinations of features that indicate "bad" emails. For embodiments, the rules are weighted with a scoring system to provide a trustability score at the end of the process, and the individual rules that trigger provide the reason information (the "why" of the trustability score). In the machine learning approach, all the Features are fed into a model, presenting good and bad messages test data in order to train the model to discern effectively between the good and bad messages. Once the model is trained, it determines trustability scores (and derived reasons) from new emails without the need for rules. Embodiments of the model require periodic training to keep it up to date with evolving threat patterns. If this is not done, its effectiveness at detecting threats will dwindle over time. The trustability score comprises 101 discrete integer values from 0 to 100. A value of 0 indicates the email is not to be trusted and is highly likely to be malicious in intent from a disreputable source. A value of 100 indicates the email is trustworthy and from a reputable source. The following are properties of the Trust Score for embodiments: The Score runs continuously from 0 to 100 without clustering of values or gaps. This supports the following: The score can be divided into three "traffic light" bands, e.g. from 0-35 (red), 36-65 (amber) and 66-100 (green), indicating emails that are definitely bad, emails where caution should be exercised, and emails that are good. If a rule decision is made based on a given Trust Score Threshold, then increasing the threshold a little should result in slightly fewer "borderline" emails matching the rule. Similarly, decreasing the threshold will match against slightly more borderline emails. In embodiments it is important that the scoring behavior remains consistent for definite good and definite bad emails (i.e. those that are correctly detected). However, the discrimination of some borderline emails will improve and those scores will migrate down or up according to whether they are bad or good.

Trust Score Generation Analytics Module 600 Output

Output is a per-email collection of trustability information: A score from 0 to 100, where 0 is "completely untrustable" and 100 is "completely trustable" and Traits and Qualifiers that "back up" the reason for the score. These may be Good traits (e.g. for a high trust score, the domain was fully authenticated and of high reputation) or Bad traits (e.g. for a low trust score, the domain was of bad reputation and the sender has never communicated with the recipient's company before). In embodiments, the traits are in the form of zero or more tuples of information: (<Integer Trait ID>, <Integer Trait Category>, <Parameter(s) for the Trait>) Integer Trait ID is the integer value that uniquely identifies the trait. Integer Trait Category is the integer Category that indicates whether the trait is good, bad or neutral. For example, a sender email homograph of a VIP might be reported as: (6, 0, 'vip.email@address.com).

Figure 7:
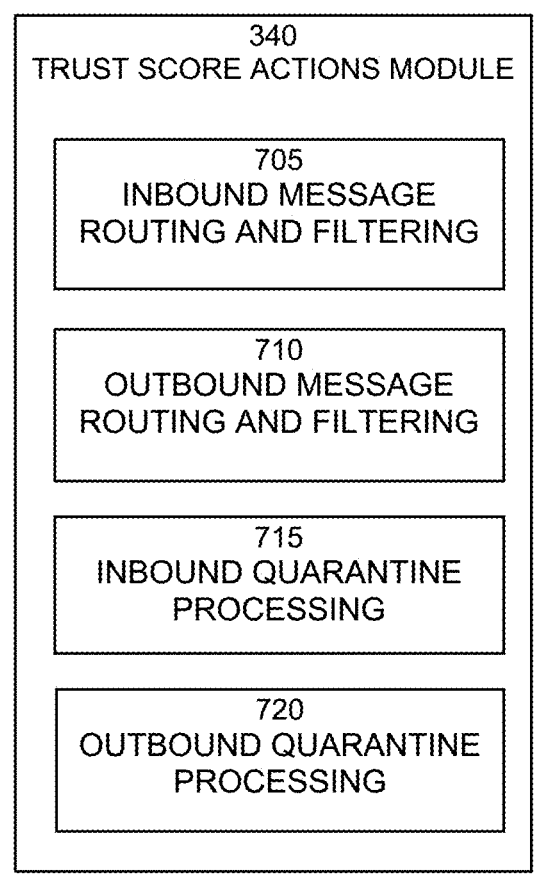
FIG. 7 is a simplified block diagram of a trust score actions module configured in accordance with an embodiment.

FIG. 7 is a simplified block diagram of Trust Score Actions Module 700 (340 of FIG. 3). Embodiments of the Trust Score Actions Module comprise Inbound Message Routing and Filtering 705; Outbound Message Routing and Filtering 710; Inbound Quarantine Processing 715; and Outbound Quarantine Processing 720.

Figure 8:
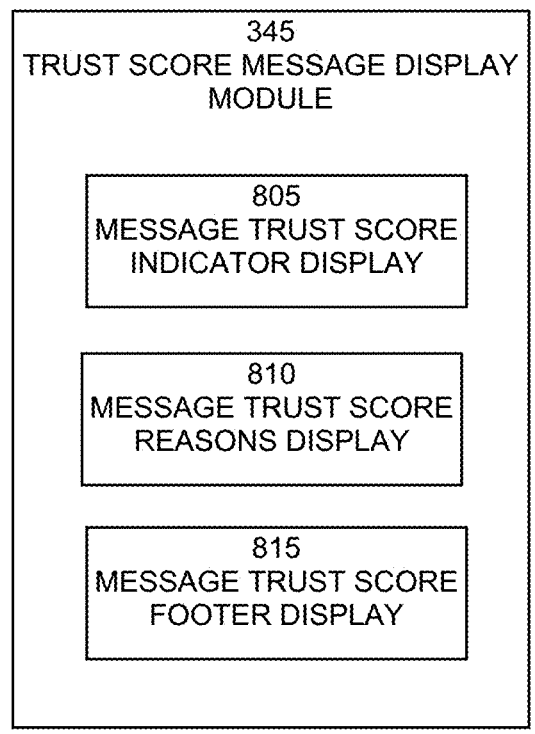
FIG. 8 is a simplified block diagram of a trust score message display module configured in accordance with an embodiment.

FIG. 8 is a simplified block diagram of Trust Score Message Display Module 800 (345 of FIG. 3). Embodiments of the Trust Score Message Display Module comprise Message Trust Score Indicator Display 805; Message Trust Score Reasons Display 810; and Message Trust Score Footer Display 815. Messages are marked with trust scores and associated information so they will be visible to the user. The associated information for the trust score includes both positive reasons (e.g., sender had a 'good' reputation, sender was on the company whitelist) and negative reasons (e.g., sender did not authenticate, sender has not previously communicated with recipient). These are examples of possible types of reasons, and are not necessarily actual reasons that the system returns. In embodiments, this data is prepended to the top of the message (see FIG. 16). For embodiments, a message will not be modified it is from a customer's scanner configured to send email messages containing only a single PDF file with no other message parts. In embodiments, the general Trust Score Message and the Top Three Trust Reasons wrapper is sufficiently unique to be able to use this to search for trust information in outbound email messages. When sending outbound email messages through the system, these trust related headers are found and removed from the message and/or from any attached messages. For HTML messages, embodiments look for a DIV that has an id or class that matches one that was added. Embodiment subject modifiers are Green: [TRUST: GOOD]; Amber: [TRUST: SUSPECT]; and Red: [TRUST: BAD]. In embodiments, indicators are removed from the subject line of outbound messages. Embodiments modify the subject line or the body of the message to indicate that the message includes trust information; the method must be the same for all customers. In embodiments a footer is added to every message such as "Trust Score Analyzed", this string is then detected to determine whether or not to display the trust information. For embodiments, the information display contains the trust indicator and a customer-configured trust score description; the associated trust score information is shown when the user hovers over the trust score indicator. In embodiments, links next to the trust score indicator enable the user to provide feedback on whether the user felt that the mail was correctly or incorrectly scored.

Figure 9:
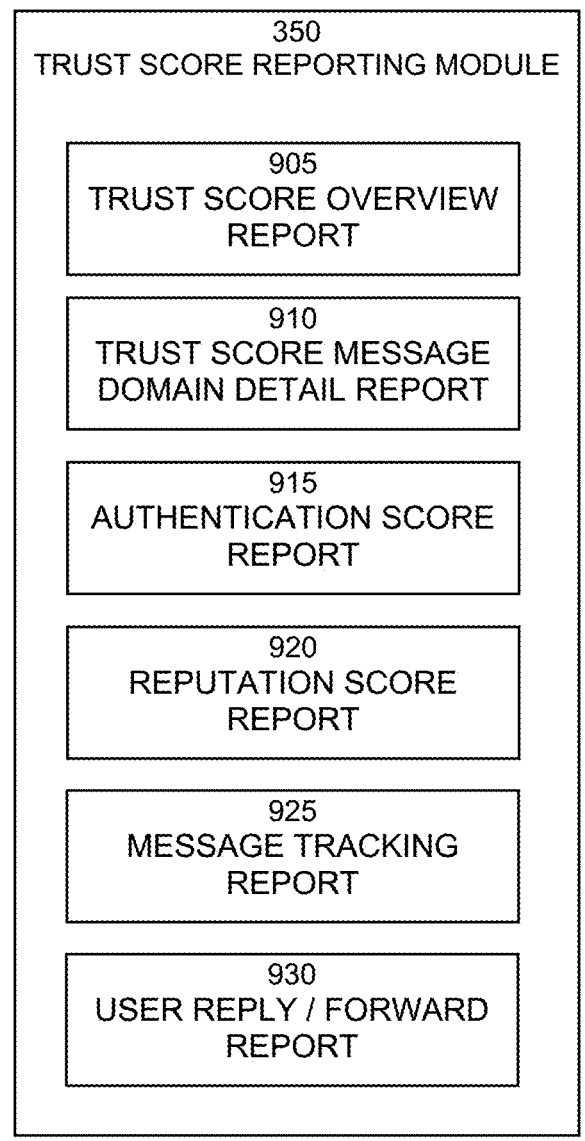
FIG. 9 is a simplified block diagram of a trust score reporting module configured in accordance with an embodiment.

FIG. 9 is a simplified block diagram of Trust Score Reporting Module 900 (350 of FIG. 3). Embodiments of Trust Score Reporting Module 350 comprise Trust Score Overview Report 905; Trust Score Message Domain Detail Report 910; Authentication Score Report 915; Reputation Score Report 920; Message Tracking Report 925; and User Reply/Forward Report 930. In embodiments, reports have filters for Trust Score, time range, domain homographs, and VIP C-level homographs. Embodiments plot mail volume over time by domain for a customer. Embodiments of Trust Score Overview Report 905 comprise drill-down to Message Detail Report 910 by clicking on the subject link. In embodiments, Trust Score Message Domain Detail Report 910 comprises Authentication Results, Trust/Reputation Results, Sending Country, Sending IP, and Frequency of Organizations communication with domain/IP fields ("Have I seen this domain from this IP before?"). This report shows which domains are sending mail to the customer, and have a plot based on Trust Score. Report embodiments use trust score ranges to keep the visualizations uncluttered. Embodiment data items include DMARC/DKIM/SPF results, Trust Score Reasons, Trust Score Color, Sending IP, and Sending Country. User Reply/Forward Report 930 embodiments support actions on messages that have been replied/forwarded with specific Trust Scores to determine if users are replying to suspect messages.

Figure 10:
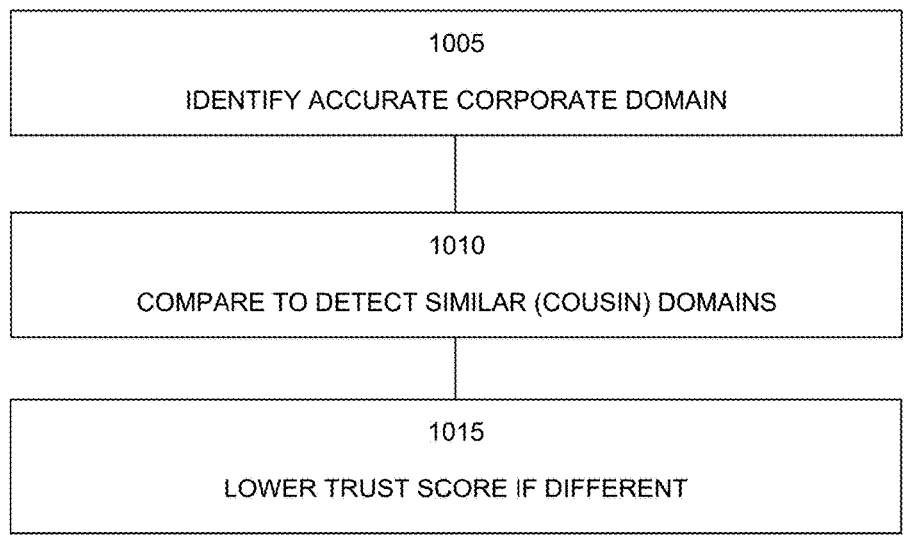
FIG. 10 is a simplified flow chart of the steps of a method for a whaling/imposter protection module configured in accordance with an embodiment.

FIG. 10 is a simplified flow chart 1000 of the steps of a method for a whaling/imposter protection module (635 of FIG. 6). In embodiments, whaling/imposter protection method steps comprise identifying accurate corporate domain 1005; compare to detect similar (cousin) domains 1010; and lowering trust score if different 1015. The whaling/imposter protection module detects similar (cousin) domains to the corporate domain and lowers the trust score.

Figure 11:
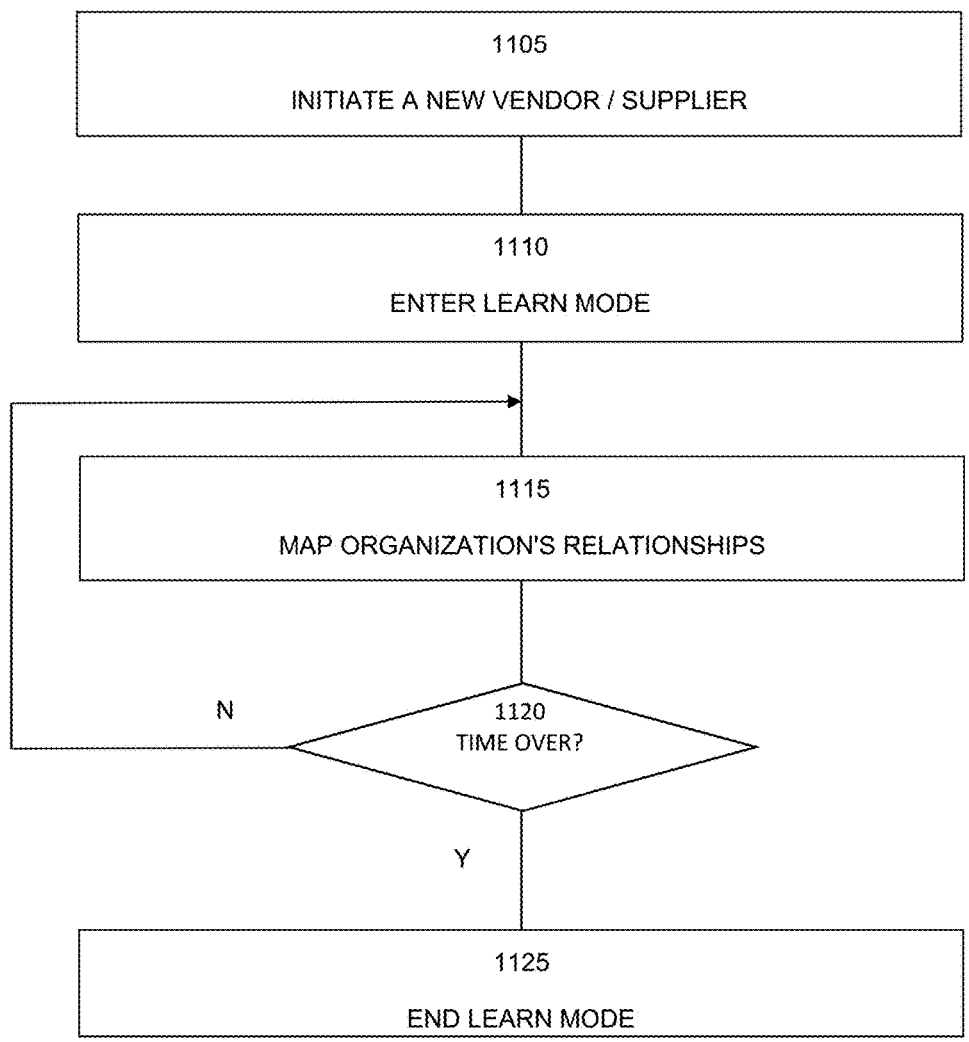
FIG. 11 is a simplified flow chart of the steps of a method for a supplier fraud protection module configured in accordance with an embodiment.

FIG. 11 is a simplified flow chart 1100 of the steps of a method for a vendor/supplier fraud protection module (635 of FIG. 6). In embodiments, vendor/supplier fraud protection method steps comprise initiating a new vendor/supplier 1105; enter learn mode 1110; map the organization's relationship with other corporate entities 1115; time over? 1120; end learn mode 1125; else return to mapping 1115. In embodiments, each new customer has a three week period where the system goes into a 'learn mode' to understand and map the organization's relationship with other corporate entities. This helps ensure the system is specifically tuned to each organization's unique mail pattern and spot anomalous transactions.

Figure 12:
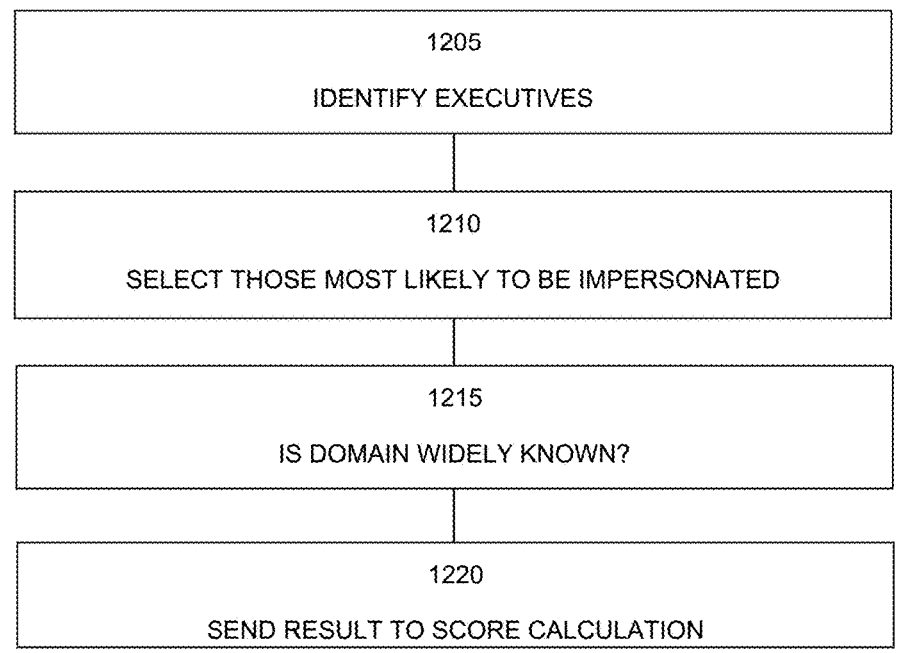
FIG. 12 is a simplified flow chart of the steps of a method for a personal email fraud protection module configured in accordance with an embodiment.

FIG. 12 is a simplified flow chart 1200 of the steps of a method for a personal email fraud protection module (645 of FIG. 6). In embodiments, personal email fraud protection method steps comprise identifying executives 1205; selecting those most likely to be impersonated 1210; is widely known domain? 1215; send result to score calculation 1220. This module automatically detects which executives are most likely be impersonated and make requests into finance personnel from personal email accounts, known as personal email fraud. These get an additional level of protection.

Figure 13:
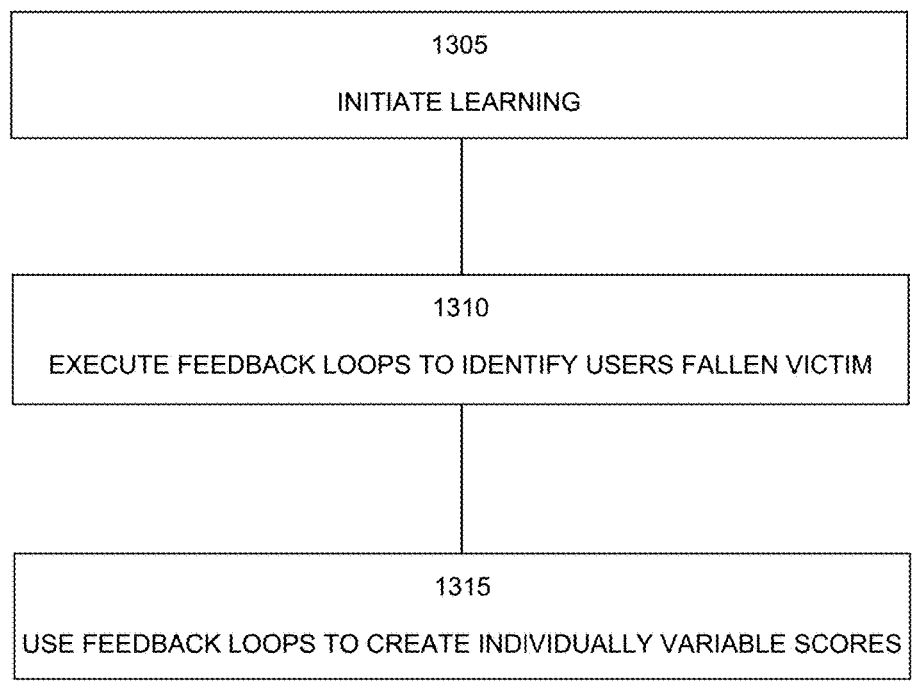
FIG. 13 is a simplified flow chart of the steps of a method for an auto-configure/learn module configured in accordance with an embodiment.

FIG. 13 is a simplified flow chart 1300 of the steps of a method for an auto-configure/learn. In embodiments, auto-configure/learn method steps comprise initiating learning 1305; executing feedback loops identify users who have fallen victim 1310; and using the feedback loops create individually variable scores (which will vary between the individual, the organization, unit, and the company as a whole) 1315.

Figure 14:
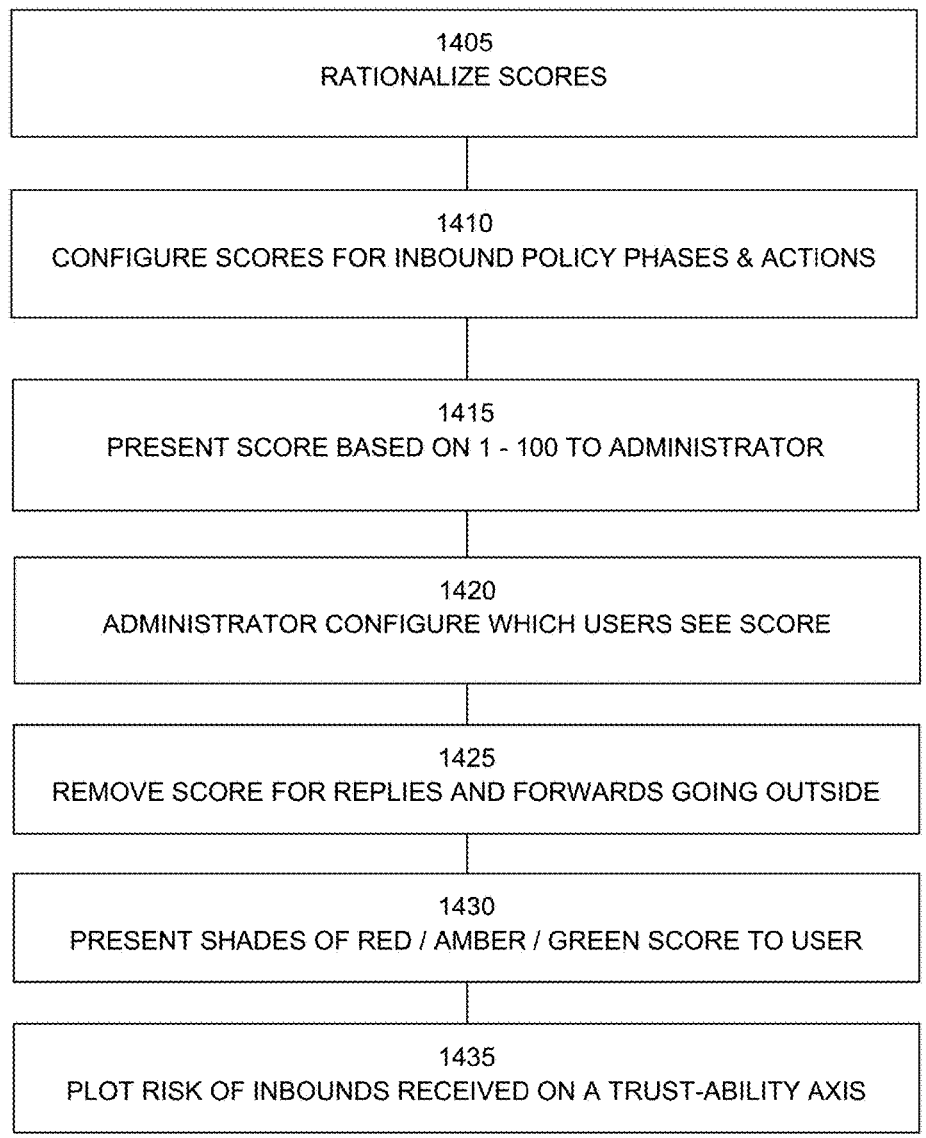
FIG. 14 is a simplified flow chart of the steps of a method for a trust score module configured in accordance with an embodiment.

FIG. 14 is a simplified flow chart 1400 of the steps of a method for a trust score module (335 of FIG. 3). In embodiments, trust score method steps comprise rationalizing scores with existing Spam/AV controls 1405; configuring scores for use in inbound actions (eg, should be able to quarantine x and above, discard y and above, tag the message with z and above) 1410; present score based on 1-100 to administrator 1415; allow administrator to configure which users will see the trust score 1420; strip out/remove the trust score for replies and forwards going outside the organization 1425; present shades of red/amber/green score to user 1430; and plot risk of inbounds received on a trust-ability axis 1435. This indicator allows the user to visualize the level of trust associated with the message and provide guidance/recommendations on how to handle the message so they can make an informed decision quickly. The message scoring algorithm considers attributes to inform a score and is based on the combination of domain reputation combined with message authentication. The message trust score/indicator is a visible indicator on all inbound mail (every externally sent message). This indicator allows the user to understand how trusted the message is, view details, and get recommendations on how to handle the message, or further validate it. In embodiments it interacts with/informs scoring on future messages by sending direct feedback.

Figure 15:
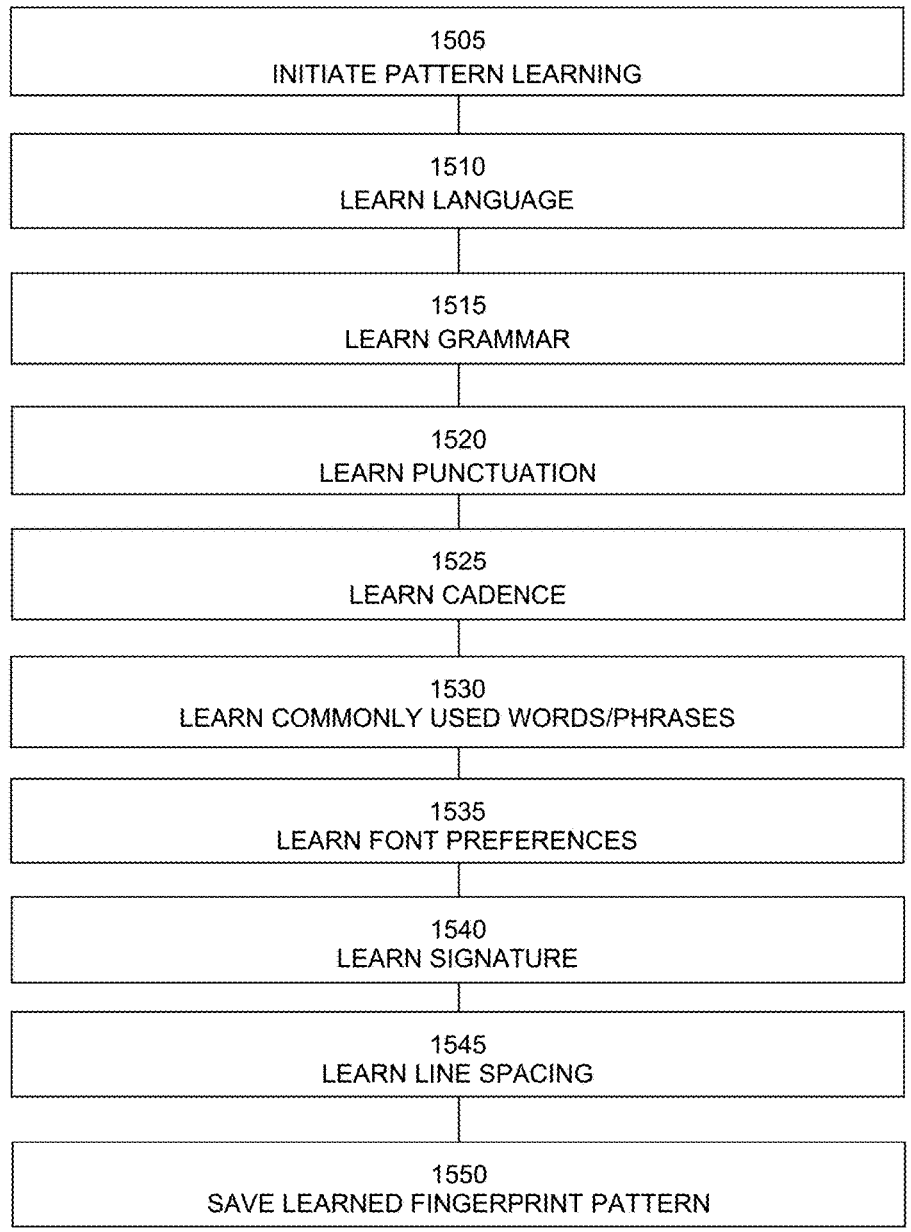
FIG. 15 is a simplified flow chart of the steps of a method for an email fingerprinting module configured in accordance with an embodiment.

FIG. 15 is a simplified flow chart 1500 of the steps of a method for an email fingerprinting module (655 of FIG. 6). High Value Targets (HVTs) have the added protection of email fingerprint. Analytics learn their communication patterns, language, grammar, punctuation, cadence, commonly used words/phrases, font preferences, signature, line spacing. In embodiments, email fingerprinting method steps comprise initiating communication pattern learning 1505; learning language 1510; learning grammar 1515; learning punctuation 1520; learning cadence 1525; learning commonly used words/phrases 1530; learning font preferences 1535; learning signature 1540; learning line spacing 1545; and saving the learned fingerprint pattern 1550 for Trust Score Analytics processing. The information gleaned assists in determining if the user is being impersonated. In embodiments, only HVTs are processed for fingerprints.

Figure 16:
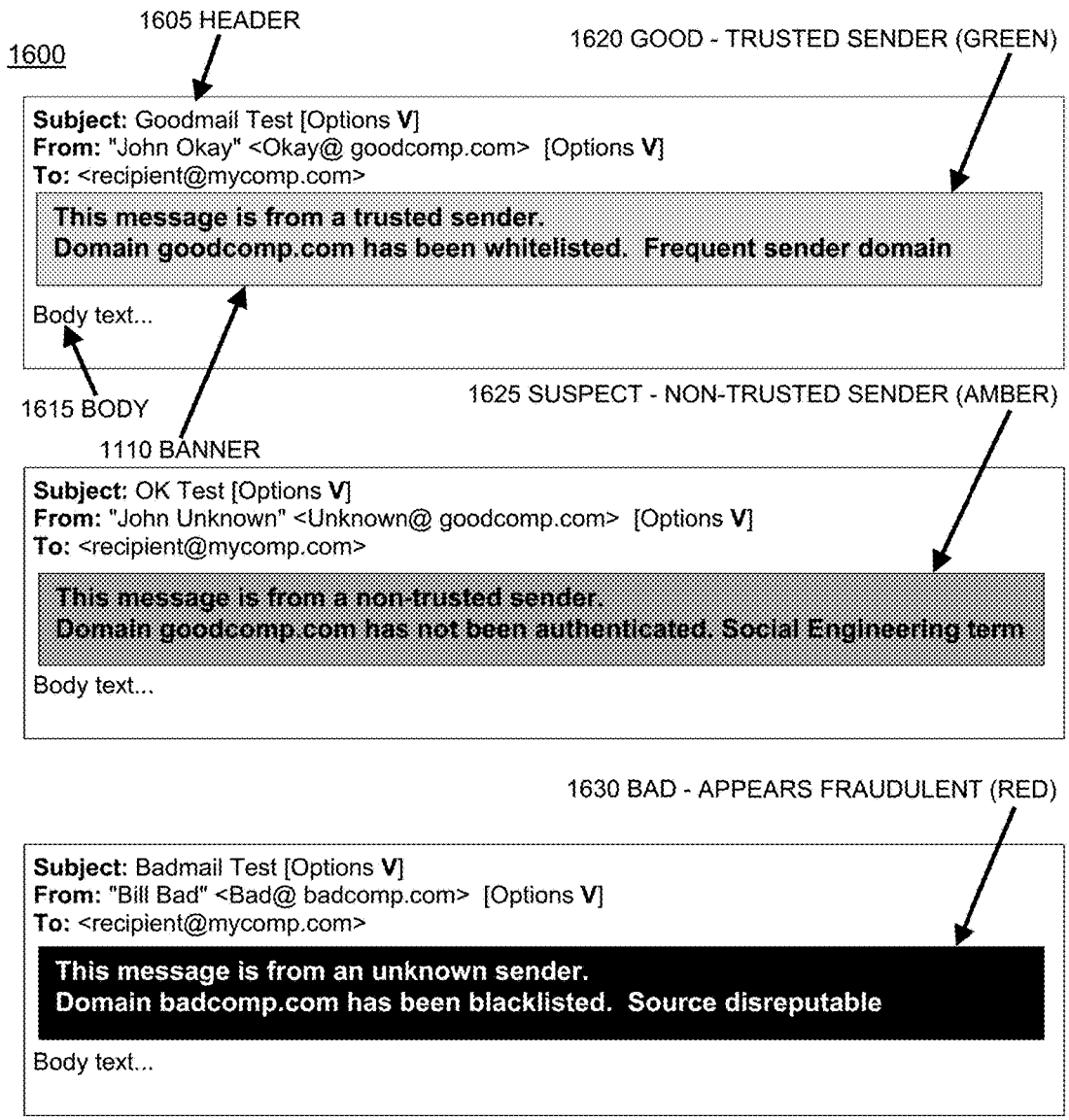
FIG. 16 is a depiction of email messages including Trust Score Display Banners configured in accordance with an embodiment.

FIG. 16 is a depiction of email messages 1600 including Trust Score Display. For embodiments, each incoming message displays header 1605, banner 1610, and body 1615. Three threat levels are depicted: GOOD, Trusted Sender (Green) 1620; SUSPECT, Non-Trusted Sender (Amber) 1625; and BAD, Appears Fraudulent (Red) 1630. In embodiments, each email recipient (To:) is provided with three reasons for the mail message threat level. These reasons are traits or qualifications attributed to the message and data related to the message. For example, the three GOOD (Green) banner reasons are "This message is from a trusted sender"; "Domain goodcomp.com has been whitelisted"; and "Frequent sender domain". For embodiments, the banner is stripped before a related message is sent.

Figure 17:
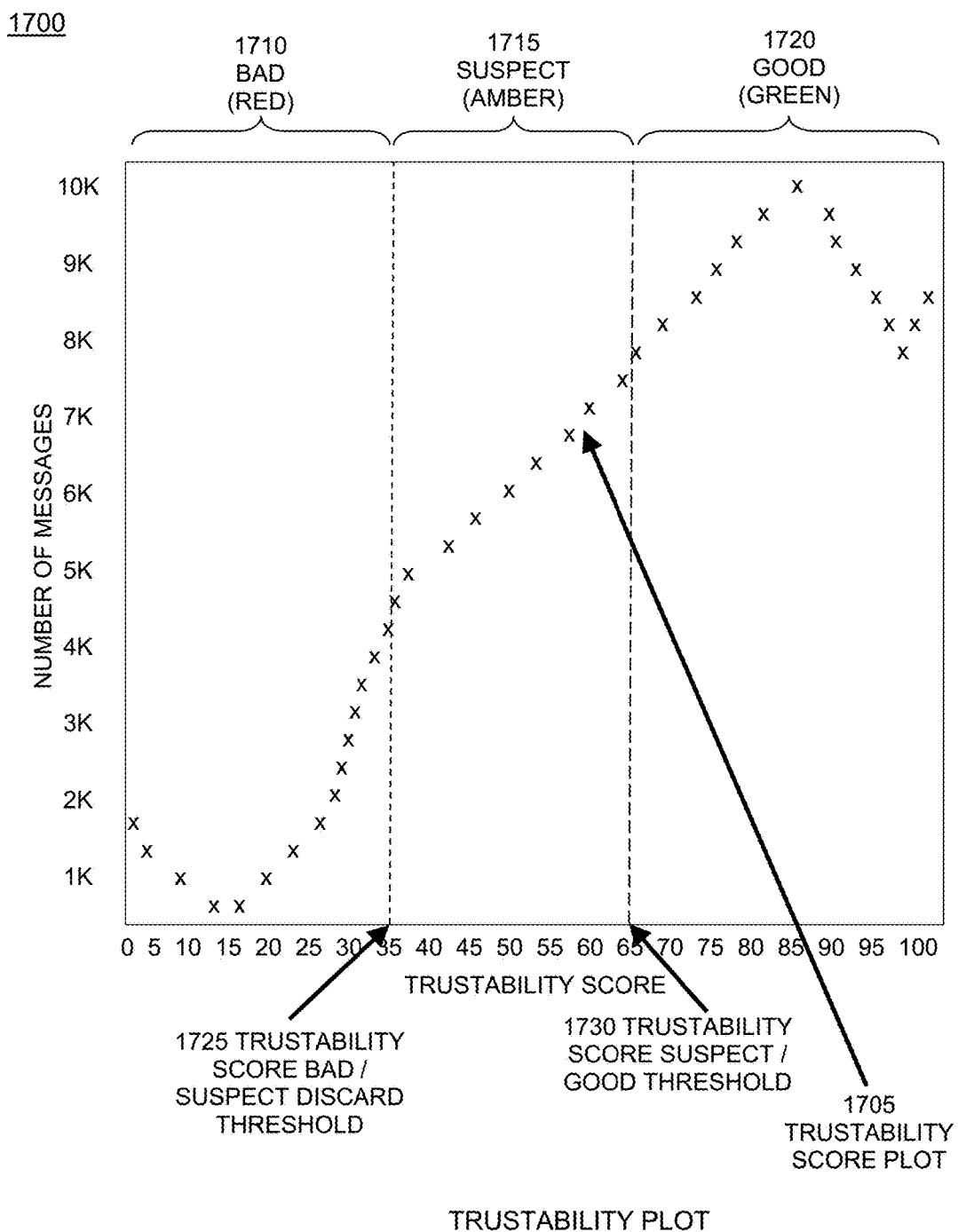
FIG. 17 is a Trustability Plot configured in accordance with an embodiment.

FIG. 17 is a Trustability Plot 1700 for Trust Score Reporting. Plot 1705 depicts continuous values of the trust score from 0 to 100, without significant grouping at discrete values. Message counts from zero to 10 k are representative, meant to convey counts relative to Trust Score values. Trust Score Trust Levels are: Trust Level BAD 1710, Trust Level SUSPECT 1715, and Trust Level GOOD 1720. Levels are determined by two thresholds, Lower (Discard) 1725 and Upper 1730.

The computing system used in the email protection platform for performing (or controlling) the operations or functions described hereinabove with respect to the system and/or the method may include a processor, I/O devices, a memory system, and a network adaptor. The computing system includes program modules for performing (or controlling) the operations or functions described hereinabove with respect to the system and/or the method according to exemplary embodiments. For example, the program modules may include routines, programs, objects, components, logic, data structures, or the like, for performing particular tasks or implement particular abstract data types. The processor may execute instructions written in the program modules to perform (or control) the operations or functions described hereinabove with respect to the system and/or the method. The program modules may be programmed into the integrated circuits of the processor. In an exemplary embodiment, the program modules may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using a network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A computer implemented method for processing email messages to prevent email social engineering attacks, comprising:
   receiving an email message;
   applying initial trust score generation analytics to said electronic message, producing an initial trustability score;
   sending, if said initial trustability score is below a trustability score threshold and said message comprises a link or attachment, said message a dynamic analysis module;
   sorting, in a score sorting module, an output trustability score from said dynamic analysis module into one of three trust levels good, suspect, or bad;
   processing, by an administrator configured rules module, output of said score sorting module;
   sending, if said initial trustability score is above said trustability score threshold, said message to said administrator configured rules module;
   processing said electronic message in said administrator configured rules module, wherein said electronic message is not quarantined, quarantined, or blocked from reaching recipient, based on said three trust levels; and
   processing said electronic message in a user configured rules module, wherein said electronic message is rescanned if, at a clicktime, a rescanned trustability score is below a trustability score threshold trustability score of said electronic message is updated, and said electronic message is returned to said dynamic analysis module if said updated trustability score is below a trustability score threshold and said message comprises a link or attachment;
   whereby said email messages are classified as good, suspect, or bad.

2. The method of claim 1, wherein said processing comprises annotating said email message with a trust level indicator and at least one trust level reason.

3. The method of claim 1, wherein said processing comprises at least one trustability report.

4. The method of claim 3, wherein said at least one trustability report comprises at least one of:
   a trust score overview report;
   a trust score message domain detail report;
   an authentication score report;
   a reputation score report;
   a message tracking report; and
   a user reply/forward report.

5. The method of claim 1, wherein said trust score generation analytics comprises:
   features generated from data sources;
   said data sources comprising derived properties of said email comprising a history of said email and/or information about customers' users;
   said features being indicators to differentiate between a trustworthy email and a malicious email.

6. The method of claim 1, wherein said method comprises machine learning, wherein all features are fed into a model, presenting good and bad messages test data, training a model to discern between said good, said suspect, and said bad messages.

7. The method of claim 1, wherein said rules are weighted with a scoring system to provide a trustability score.

8. The method of claim 1, wherein said rules that are triggered provide reason information for said email message classifications as good, suspect, or bad.

9. The method of claim 1, wherein said rules each comprise a rule name, a rule test, and rule actions with default values;
   said rules linking combinations of features and comparisons against thresholds, identifying combinations of features indicating bad emails.

10. A system for processing email messages to prevent email social engineering attacks comprising:
    a processor;
    a memory system comprising one or more computer-readable non-transitory media configured to store instructions for an email protection application comprising:
    a configuration setup module;
    a trust score generation analytics module configured by said configuration setup module to process said email messages;
    a trust score actions module performing actions based on output of said trust score generation analytics module;
    a trust score message display module, generating said message display from output of said trust score generation analytics module; and a trust score reporting module, producing reports from output of said trust score generation analytics module;

whereby said email messages are classified as good, suspect, or bad;

said processing comprising:
rationalizing scores with spam and antivirus controls;
configuring scores for use in inbound actions;
presenting a trust score based on 1 to 100 to administrator rules;
configuring, by said administrator, which users see said trust score;
presenting a trust score message display in said message to user;
removing said trust score message display from message replies and forwards going outside an organization; and
plotting risk of inbound messages received on a trustability axis.

11. The system of claim 10 wherein said configuration setup module comprises:
global and user data management processing;
provisioning processing;
de-provisioning processing;
service priming processing;
list population processing;
inbound configuration processing;
outbound configuration processing;
policy configuration processing; and
trust score rule wizard processing.

12. The system of claim 10 wherein said trust score generation analytics module comprises:
feature generation processing;
feature review processing;
trustability score processing;
trustability decision processing;
global list processing;
customer list processing;
whaling/imposter protection processing;
supplier fraud protection processing;
personal email fraud protection processing;
homograph processing;
email fingerprinting processing; and
analytic feedback loop processing.

13. The system of claim 10 wherein said trust score actions module comprises:
inbound message routing and filtering;
outbound message routing and filtering;
inbound quarantine processing; and
outbound quarantine processing.

14. The system of claim 10 wherein said trust score message display module comprises:
a message trust score indicator display;
a message trust score reasons display; and
a message trust score footer display.

15. The system of claim 10 wherein said trust score reporting module comprises at least one of:
a trust score overview report;
a trust score message domain detail report;
an authentication score report;
a reputation score report;
a message tracking report; and
a user reply/forward report.

16. The system of claim 10 wherein auto configure learning comprises:
initiating learning;
executing feedback loops to identify users who have fallen victim; and
using said feedback loops to create individually variable scores, said individually variable scores varying between individual, organization, unit, and company.

17. The system of claim 10 wherein said fingerprinting comprises:
initiating communication pattern learning;
learning language;
learning grammar;
learning punctuation;
learning cadence;
learning commonly used words/phrases;
learning font preferences;
learning signature;
learning line spacing; and
saving learned fingerprint pattern for trust score analytics processing.

18. The system of claim 10 wherein, at a clicktime, said email is reprocessed by said trust score generation analytics module producing a rescanned trustability score; and
if said rescanned trustability score is below a trustability score threshold trustability score of said electronic message is updated, and said electronic message is returned to said trust score actions module.

19. A non-transitory computer-readable medium for preventing email social engineering attacks comprising instructions stored thereon, that when executed on a processor, perform the steps of:
configuring an email protection application in a configuration setup module;
processing email messages in a trust score generation analytics module configured by said configuration setup module;
performing actions in a trust score actions module based on output of said trust score generation analytics module;
generating, in a trust score message display module, a message display from output of said trust score generation analytics module; and
producing, by a trust score reporting module, reports from output of said trust score generation analytics module;
whereby said email messages are classified as good, suspect, or bad;
said processing comprising:
rationalizing scores with spam and antivirus controls;
configuring scores for use in inbound actions;
presenting a trust score based on 1 to 100 to administrator rules;
configuring, by said administrator, which users see said trust score;
presenting a trust score message display in said message to user;
removing said trust score message display from message replies and forwards going outside an organization; and
plotting risk of inbound messages received on a trustability axis.

* * * * *